April 26, 1966      W. E. KEMP      3,248,026

HOPPER STRUCTURE FOR PNEUMATICALLY UNLOADING BULK MATERIALS

Filed July 29, 1964      6 Sheets-Sheet 1

INVENTOR.
WILLARD E. KEMP
BY
AGENT

April 26, 1966   W. E. KEMP   3,248,026
HOPPER STRUCTURE FOR PNEUMATICALLY UNLOADING BULK MATERIALS
Filed July 29, 1964   6 Sheets-Sheet 2

United States Patent Office 3,248,026
Patented Apr. 26, 1966

3,248,026
HOPPER STRUCTURE FOR PNEUMATICALLY UNLOADING BULK MATERIALS
Willard E. Kemp, Bridgeton, Mo., assignor to ACF Industries, Incorporated, New York, N.Y., a corporation of New Jersey
Filed July 29, 1964, Ser. No. 385,998
11 Claims. (Cl. 222—54.5)

This invention relates to apparatus for unloading bulk materials and more particularly to apparatus for pneumatically unloading pulverulent or granular materials from a hopper structure.

The present invention is particularly adapted for pneumatic unloading of particulate or finely-divided materials, such as pulverulent and granular materials, from beneath a generally rectangular gate which slides back and forth between open and closed positions. A bottom cover beneath the gate forms with the gate a discharge chamber which leads to an elongate pneumatic discharge conduit positioned adjacent a side of the chamber for the pneumatic discharge of the material. For gravity unloading the bottom cover is moved to an open position permitting the material to drop from the bottom of the discharge chamber.

The elongate pneumatic discharge conduit extends beneath the gate along the length thereof in a direction generally transversely of the direction of sliding movement of the gate for substantially the entire length of the gate. Thus, for gates of relatively long lengths, such as five or six feet, the present arrangement allows the material to feed from the discharge chamber into the discharge conduit generally along the length of the gate which results in a high rate of discharge and a highly effective cleanout.

It is an object of the present invention to provide apparatus for pneumatically unloading finely-divided materials from beneath a sliding gate structure in a minimum of time and with a highly effective cleanout of the hopper structure.

It is an additional object of the invention to provide apparatus for unloading finely-divided material from a sliding gate structure either pneumatically or by gravity.

A further object is to provide apparatus for pneumatically unloading finely-divided materal from the bottom of a railway hopper car and which requires only a minimum of space in which to be positioned.

Briefly described, the invention includes a botttom outlet structure adapted to be secured beneath the bottom outlet of a hopper structure for the selective pneumatic discharge of finely-divided particles and comprising, a generally rectangular gate slidable back and forth in opposite directions between open and closed positions relative to the bottom outlet, a cover beneath the gate forming with the gate a discharge chamber into which particles flow upon opening of the gate, an elongate conduit below the gate adjacent the cover and extending in a direction generally transversely of the sliding movement of the gate for substantially the entire length of the gate, and means forming a passageway between the discharge chamber and the conduit for pneumatically removing the particles along substantially the entire length of the gate in a generally uniform manner. For best results, the cross-sectional area of the discharge chamber perpendicularly to the direction of flow of the particles into the conduit should be limited in size. For example, employing an air compressor having a capacity around 400 to 500 c.f.m. the cross-sectional area of the discharge chamber should not substantially exceed 50 square inches. Thus, the cover and gate may be mounted in a generally parallel relation to each other to provide a discharge chamber having a generally uniform cross-sectional area. Air is drawn in one end of the elongate conduit and the air stream with the particles entrained therein is removed from the other opposite end of the conduit.

The invention accordingly comprises the constructions hereinafter described, the scope of the invention being indicated in the following claims.

In the accompanying drawings, in which one of various possible embodiments of the invention is illustrated.

Figure 1:
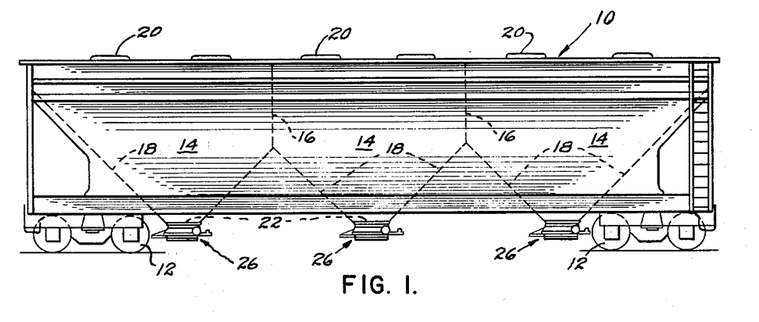
FIGURE 1 is an elevational view of a railway hopper car having a plurality of bottom outlet structures comprising the present invention.

Referring to the drawings and more particularly to FIGURE 1, a covered hopper car is indicated generally at 10 and has a truck assembly 12 at each end. Car 10 has a plurality of hoppers 14 separated by bulkheads or partitions 16. Hopper slope sheets 18 funnel downwardly from partitions 16 to form bottom discharge openings 22. Hatch covers 20 open into hoppers 14 for loading car 10.

Figure 2:
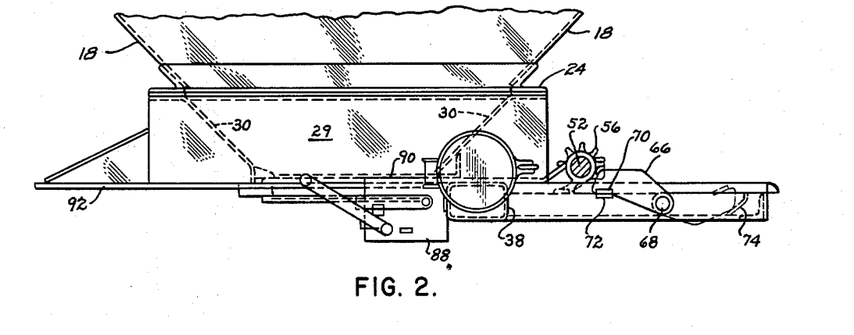
FIGURE 2 is an enlarged end elevation of an outlet structure comprising the present invention and attached to a hopper structure.
Figure 3:
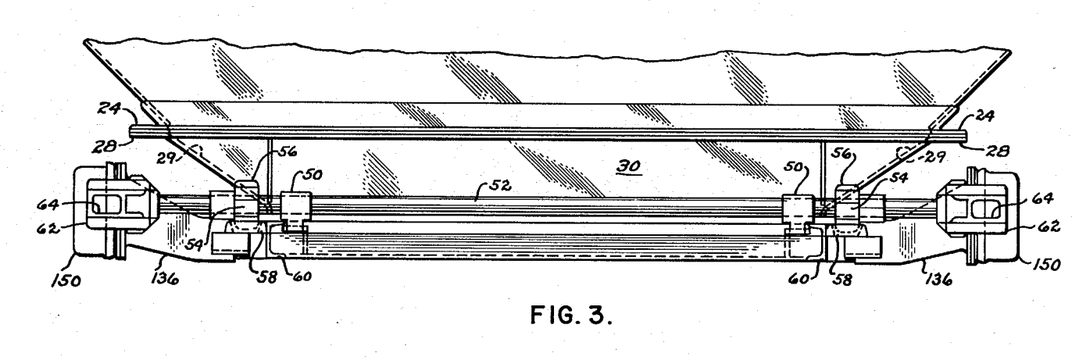
FIGURE 3 is an enlarged side elevation of the outlet structure shown in FIGURE 2.
Figure 4:
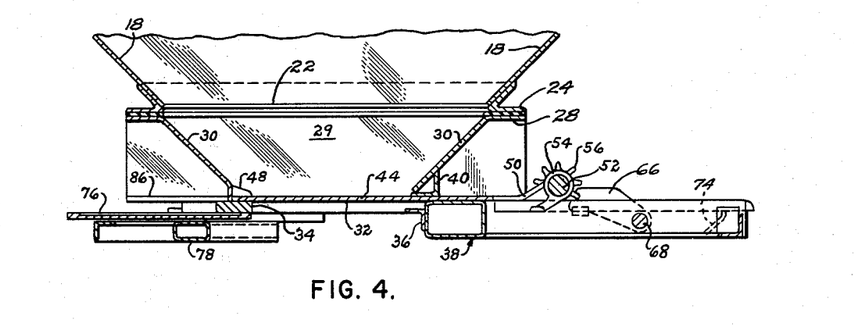
FIGURE 4 is a transverse section of the outlet structure of FIGURES 2 and 3 illustrating the gate in closed position and the bottom cover in open position for gravity discharge of material.
Figure 5:
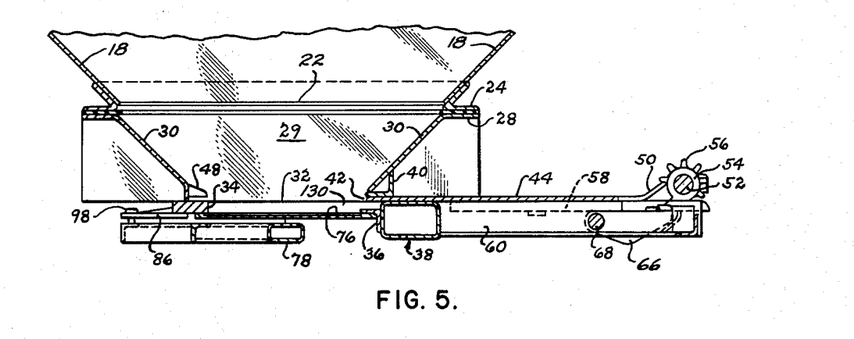
FIGURE 5 is a transverse section similar to FIGURE 4 but showing the bottom cover closed and the gate open for the pneumatic discharge of material.
Figure 6:
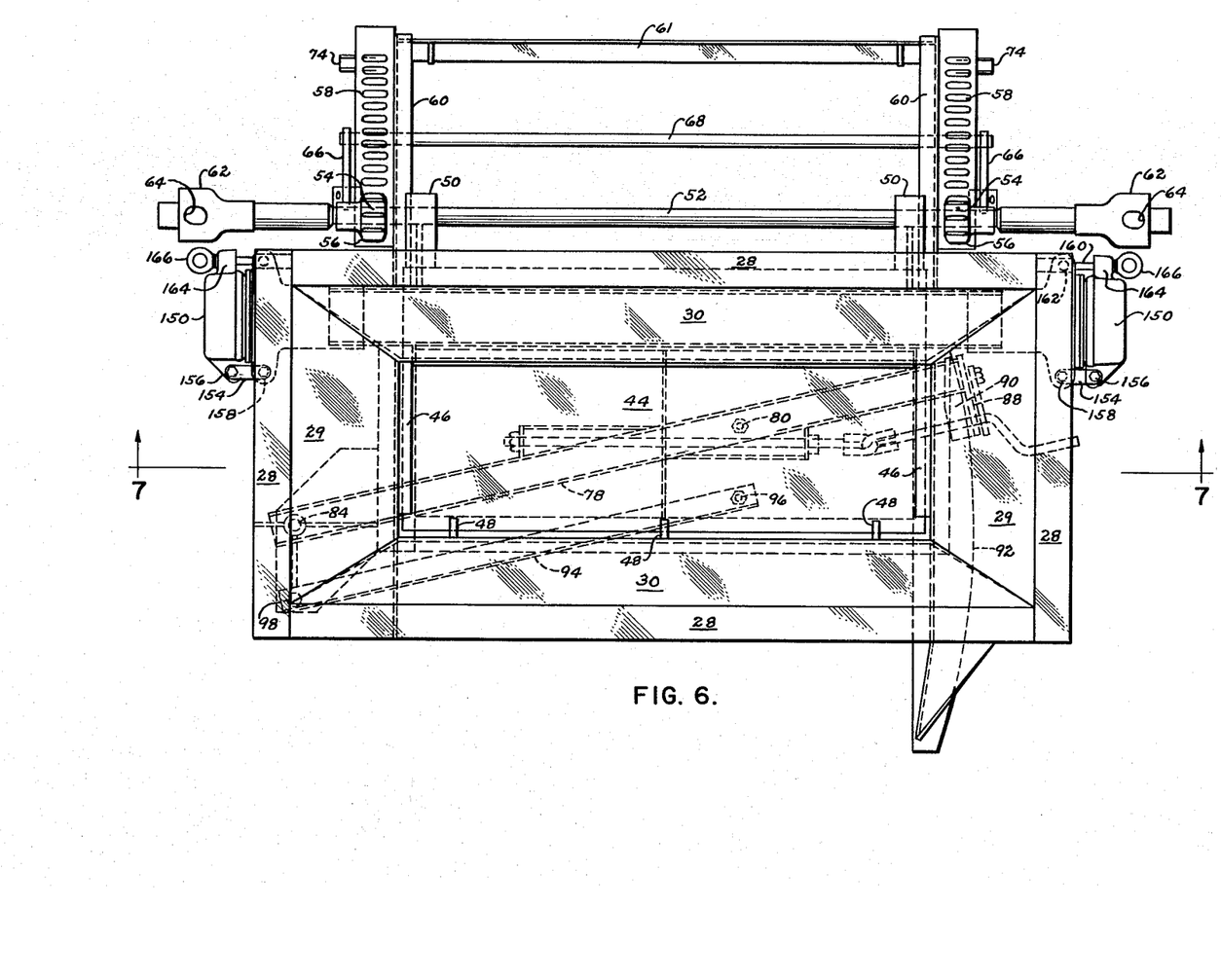
FIGURE 6 is a top plan of the outlet structure of FIGURES 2-5 showing the gate and cover in closed position.
Figure 7:
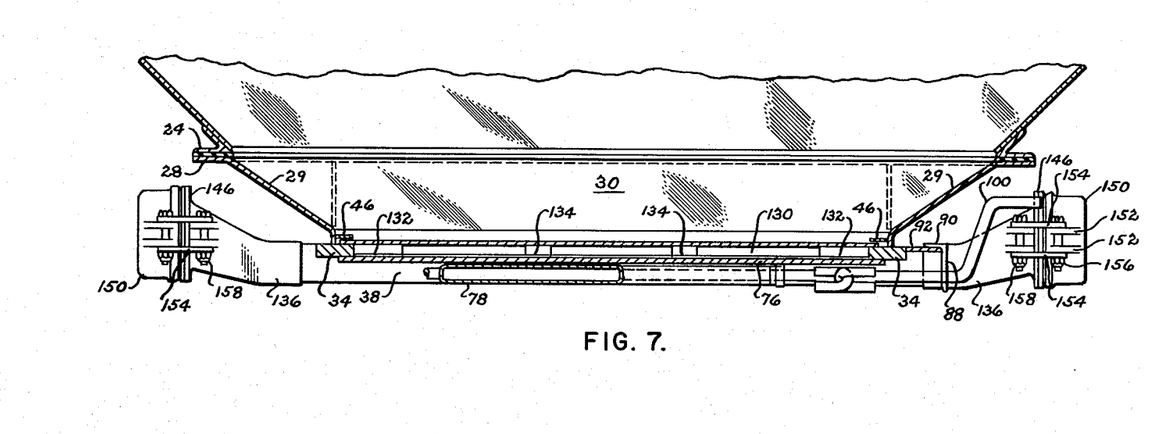
FIGURE 7 is a longitudinal section of the outlet structure taken generally along line 7—7 of FIGURE 6 and showing the passageway for the pneumatic discharge of particles from the discharge chamber formed between the gate and the bottom cover, a portion of the hopper structure being shown in section.

Extending around the periphery of each opening 22 is an outwardly extending flange 24 as shown in FIGURES 2-5. Secured to flange 24 of each hopper 14 by suitable means, such as by welding, is a bottom outlet structure indicated generally at 26. Each outlet structure 26 is identical and has an upper peripheral flange 28 adapted to fit against flange 24 as shown in FIGURES 2-5. End outlet slope sheets 29 extend between and connect side outlet slope sheets 30 of outlet structure 26. Slope sheets 29 and 30 funnel downwardly to a generally rectangular opening 32. Forming three sides of a generally rectangular frame beneath opening 32 are bars 34 of a rectangular cross section. An angle 36 beneath one of the slope sheets 30 forms a portion of the remaining side of the rectangular frame (see particularly FIGURES 4 and 5). Lower angle 36 is secured, such as by welding, to a tubular member generally designated 38 which also forms a portion of the remaining side of the rectangular frame beneath opening 32 as well as forming a material discharge conduit, as well be explained more fully. Tubular member 38 has a flat upper surface and is of a non-circular cross section, such as a generally rectangular cross section. An upper reinforcing angle 40 is secured, such as by welding, to the adjacent side slope sheet 30 and is spaced from tubular member 38 to form a gate slot 42 therebetween as shown in FIGURE 5. Mounted for sliding movement within slot 42 along the flat upper surface of tubular member 38 and bars 34 is a gate 44. A flange 46 on each end slope sheet 29 forms a side retaining guide strip for gate 44 as it moves along bars 34 as shown in FIGURES 6 and 7. Spaced end lugs 48 secured to the side slope sheet 30 opposite gate slot 42 position gate 44 in the closed position thereof as shown in FIGURES 4 and 6.

A pair of spaced arms 50 extend rearwardly from gate 44 as shown in FIGURES 3 and 6 and form bearing supports for a pinion shaft 52. A pinion 54 adjacent each end of shaft 52 has teeth 56 engaging an associated rack 58. Racks 58 are secured, such as by welding, to channel members 60 which support gate 44 for movement to open position. A cross brace 61 extends between the rear ends of channel members 60. A capstan 62 on each end of shaft 52 has suitable openings 64 therein to permit a spike or the like to be inserted for rotating shaft 52 and pinions 54. Rotation of pinions 54 which are in engagement with racks 58 open and close gate 44.

To hold gate 44 in closed position as shown in FIGURES 2 and 6, a stop lever 66 is mounted on each end of a shaft 68 supported on channel members 60. Stop levers 66 engage shaft 52 in the closed position of gate 44 to prevent rearward movement of the gate. Each lever 66 has a lug 70 adapted to fit against a complementary lug 72 secured to the adjacent channel member 60 in the closed position of gate 44 as shown in FIGURE 2. A suitable seal may pass through aligned openings in lugs 70 and 72 to seal the gate in closed position thereby to prevent undetected opening of gate 44. To permit opening of gate 44, stop levers 66 are swung against supports 74 on racks 78 to the dotted line indication of FIGURE 2.

Figure 8:
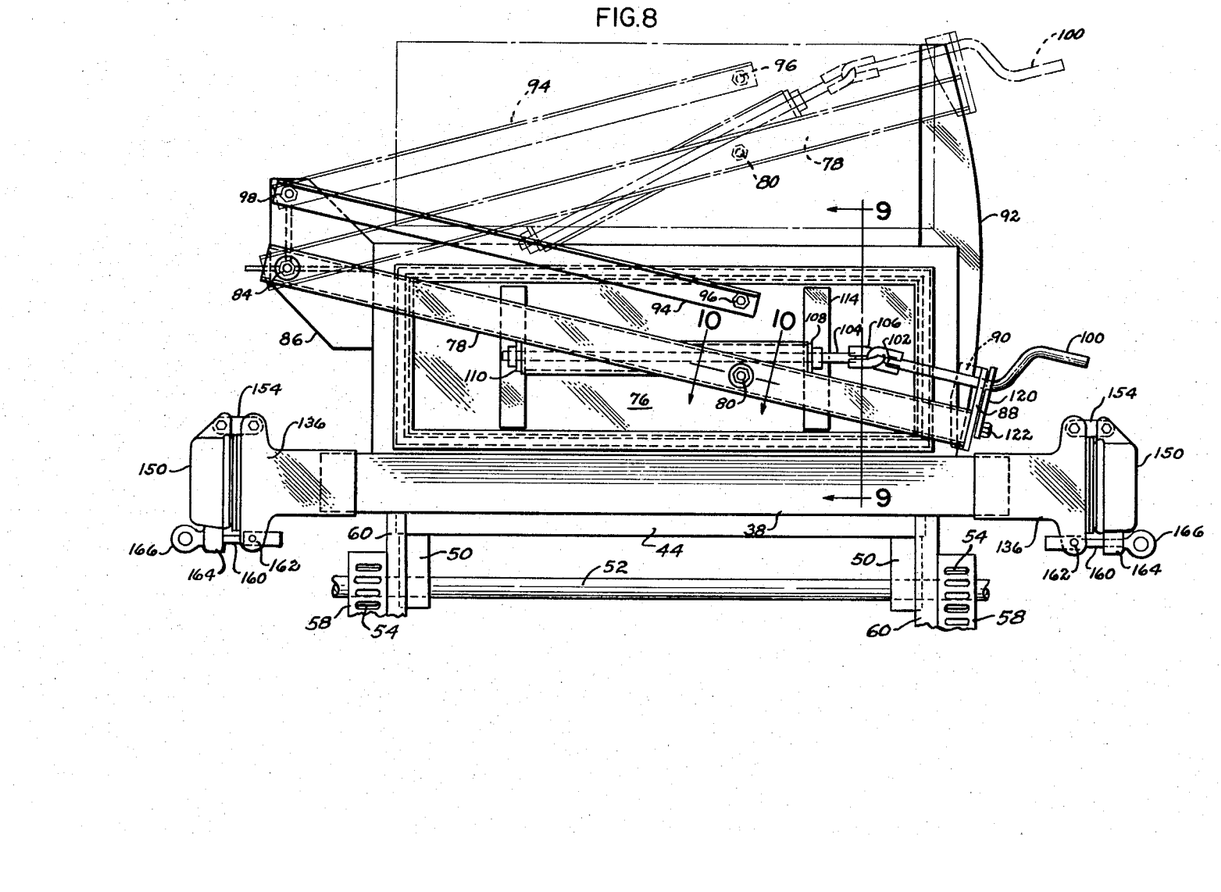
FIGURE 8 is a partial bottom plan of the outlet structure of FIGURES 2-6 showing the cover in closed position, the open position of the cover being indicated in broken lines.
Figures 10, 11:
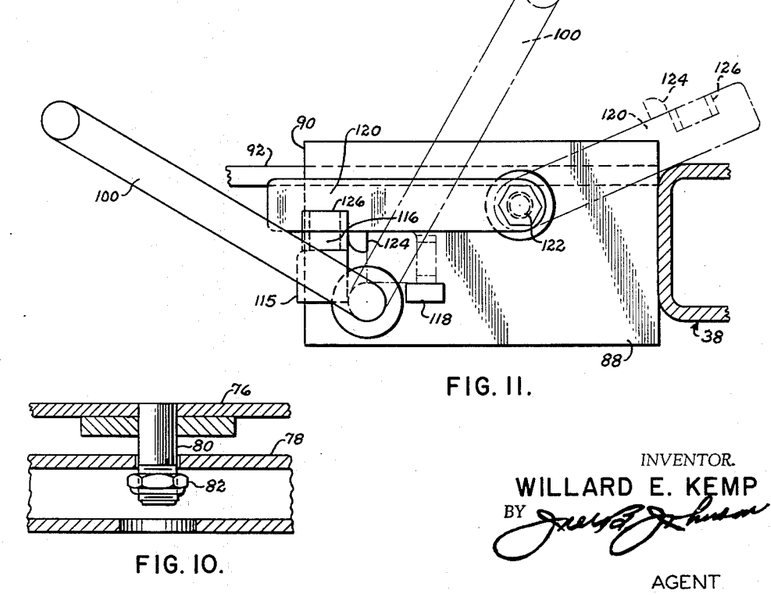
FIGURE 10 is a section taken generally along line 10—10 of FIGURE 8 and inverted for illustrating a pivotal support for the bottom cover.
FIGURE 11 is an enlarged fragment of FIGURE 2 illustrating the means to lock the bottom cover in closed position, the elongate conduit being shown in section.

Mounted beneath gate 44 and fitting against the rectangular frame formed by bars 34 and lower angle 36 is a bottom cover or plate 76. Cover 76 is pivotally supported on arm 78 and movable between an open position as shown in FIGURE 4 to permit gravity discharge of particles and a closed position as shown in FIGURE 5 to permit the pneumatic discharge of particles. As shown in FIGURE 10 in the closed position of cover 76, a pivot pin 80 is secured to cover 76 and fits through an opening in arm 78. A suitable nut 82 retains arm 78 on pivot pin 80. Arm 78 is pivotally mounted at one end to pivot 84 on projection 86 as shown in FIGURE 8. Secured to the other opposite end of arm 78 is a generally vertical plate 88 having an inturned upper lip 90 running along an arcuate support guide 92 welded to the adjacent bar 34 as shown in FIGURES 8 and 11. Arm 78 is supported along guide 92 during its movement between open and closed positions.

To hold cover 76 so that the transverse and longitudinal axes of cover 76 remain oriented and parallel to the transverse and longitudinal axes of gate 44 during the movement of the cover between open and closed positions, a second arm 94 has one end pivoted at 96 to cover 76 as shown in FIGURE 8. The other opposite end of arm 94 is pivoted at 98 to extension 86. Pivots 80, 84, 96 and 98 form a parallelogram linkage to hold the axes of cover 76 parallel to the axes of gate 44 during movement of the cover between open and closed positions.

Figure 9:
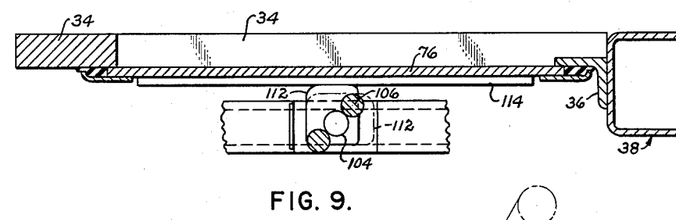
FIGURE 9 is a section taken generally along line 9—9 of FIGURE 8 and inverted for illustrating means to urge the bottom cover into tight engagement at the closed position.

Cover 76 moves downwardly from engaged closed position before being swung laterally to its open position illustrated in broken lines in FIGURE 8. Cover 76 is moved upwardly to its closed position at the end of its lateral movement from open position. To raise and lower cover 76, a crank arm 100 extends through plate 88 and has an eye 102 on the inner end thereof as shown in FIGURE 8. A camshaft 104 has an eye 106 engaging eye 102. Shaft 104 is mounted within bearings 108 and 110 carried by arm 78. As illustrated in FIGURE 9, camshaft 104 has a cam 112 thereon and when rotated counterclockwise as viewed in FIGURE 9 engages stiffener 114 on cover 76 to urge cover 76 tightly against bars 34 and angle 36. Cover 76 is resilient and cam 112 when rotated between raised and lowered positions of cover 76 effects a slight bowing or arching of the cover.

A block support 115 illustrated in FIGURE 11 is welded to crank arm 100 and carries an apertured lug 116 which extends beyond support 114. Support 115 abuts stop 118 on plate 88 upon rotation of crank arm 100 to open position. A catch 120 is mounted for rotation about pivot 122 on plate 88. An extension 124 on catch 120 engages lug 116 in the closed position of cover 76 to prevent rotation of crank arm 100 as shown in FIGURE 11. An apertured lug 126 on catch 120 is aligned with lug 116 in the closed position of cover 76. A suitable seal or the like may be placed through the aligned apertures in lugs 116 and 126 to prevent undetected opening of bottom cover 76. To open bottom cover 76 from its closed position, catch 120 is first swung to the broken line indication of FIGURE 11. Then, crank arm 100 is rotated to its broken line indication. The rotation of crank arm 100 rotates camshaft 104 in a counterclockwise direction as viewed in FIGURE 9 and cam 112 is rotated downwardly permitting cover 76 to move downwardly out of engagement with the rectangular frame beneath gate 44. Bottom cover 76 may be easily swung about pivots 80, 96 along guide 92 to the broken line position of FIGURE 8. Gate 44 is opened after the opening of cover 76 for gravity discharge of lading from the hopper.

Referring particularly to FIGURES 5 and 7 and constituting an important feature of this invention, tubular conduit 38 forms a discharge passage for the pneumatic discharge of particles from a discharge chamber 130 formed between gate 44 and bottom cover 76. Particles to be pneumatically unloaded pass from discharge chamber 130 through end slots 132 and intermediate slots 134 in conduit 38 which form particle passageways. Conduit 38 extends along the length of gate 44 to form a discharge area along the length of the gate. Gate 44 and cover 76 extend in parallel relation to each other and form chamber 130 of a generally uniform cross-sectional area.

For best results, discharge chamber 130 is formed of a cross-sectional area adjacent slots 132, 134 not substantially exceeding fifty (50) square inches when an air compressor having a capacity of around 500 c.f.m. is employed. For example, if chamber 130 is of a length of around four (4) feet, the spacing between cover 76 and gate 44 should not substantially exceed one (1) inch. If an air compressor having a capacity of around 1000 c.f.m. is employed, the maximum cross-sectional area of chamber 130 adjacent conduit 38 should not substantially exceed ninety (90) square inches.

Figure 12:
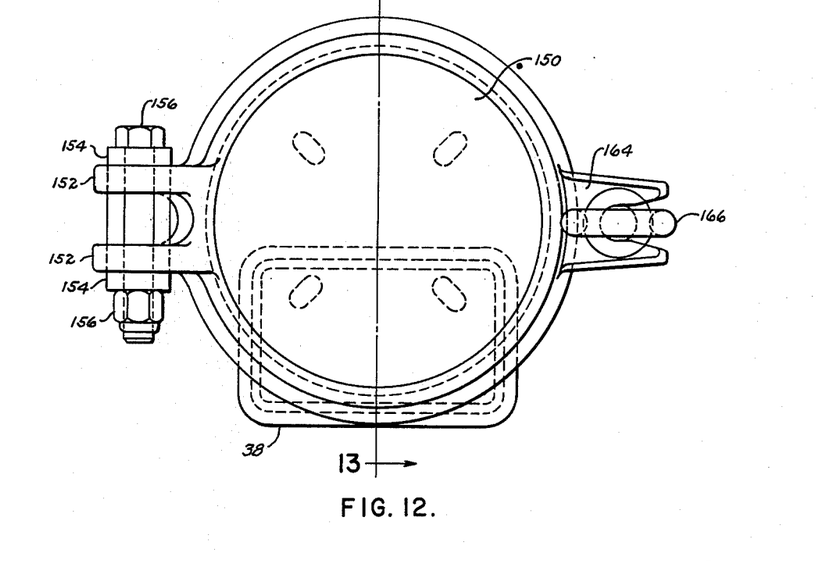
FIGURE 12 is an end elevation of an end cap fitting about an end of the discharge conduit.
Figure 13:
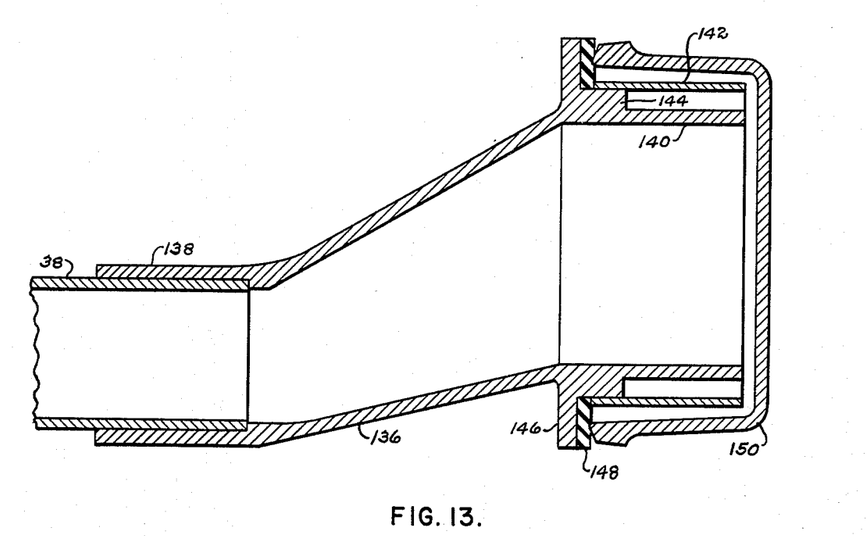
FIGURE 13 is a sectional view taken generally along line 13—13 of FIGURE 12.

Referring also to FIGURES 12 and 13, a transition section 136 is secured to each end of conduit 38. End 138 of transition section 136 fits about conduit 38 and is of a generally rectangular cross section. The other opposite end 140 of transition section 136 is circular in cross section and is adapted to fit within a discharge suction hose or the like (not shown) for the conveying of particles to be unloaded. A sleeve 142 of an enlarged diameter is fitted about an annular rim 144 on end 140 to adapt transition section 136 for fitting a suction hose of an increased diameter. Sleeve 142 may be press-fitted on rim 144. An annular flange 146 extends outwardly from transition section 136 and has a gasket 148 fitting against one face thereof. An end cap 150 fits around the outer end of each transition section 136. Links 154 are pivotally connected at one end by a nut and bolt combination 156 to lugs 152 on end cap 150 (see FIGURES 7 and 12). The other opposite ends of links 154 are pivotally connected at 158 to lugs on transition section 136 as shown in FIGURES 7 and 8. To secure each cap 150 in closed position over the adjacent end of transition section 136, a swing bolt 160 is pivotally connected at 162 to each transition section. A slotted extension 164 on end cap 150 receives bolt 160. An eye nut 166 threaded on bolt 160 may be screwed tight against extension 164 to secure end cap 150. Transition section 136 slants upwardly from conduit 38 so that the clearance for end cap 150 is substantially the same as the clearance for conduit 38. Conduit 38 may be unloaded from either end as desired.

Operation for the pneumatic discharge of particles is as follows:

The end cap 150 on the side of railway car 10 from which it is desired to unload is first loosened and swung about pivots 156, 158 to open position thereby exposing the adjacent end of transition section 136. A suitable suction hose (not shown) is fitted on transition section 136 about end 140 sleeve 142 depending on the diameter of the hose. The other end cap 150 on the opposite side of the car may be opened, if desired, to permit the entrance of air. A suitable suction, such as, for example, 500 cubic feet a minute (c.f.m.) is applied through the hose and a suction or vacuum is exerted on chamber 130 through slots 132, 134. Next, with bottom cover 76 closed, gate 44 is fully opened by rotation of capstans 62 to the position shown in FIGURE 5. In this position the material is unloaded until the particles adjacent at least a portion of slots 132, 134 are removed to short circuit the air being drawn in from the end of conduit 38. At this unloading stage, a major portion of the material has been unloaded and it is only necessary to clean out the bottom portion of the hopper as particles normally remain along the side of the hopper opposite conduit 38. To accomplish this, gate 44 is moved toward closed position at a slow rate of movement and the remaining material is removed from the hopper.

Conduit 38 thus effects a relatively rapid unloading of the hopper with a minimum amount of material remaining after unloading. The unloading is accomplished along the entire length of the gate from discharge chamber 130 formed between gate 44 and bottom cover 76. Discharge chamber 130 is of a cross-sectional area facing conduit 38 not substantially exceeding a maximum amount of around fifty (50) square inches with a compressor having a capacity of around 500 c.f.m. Conduit 38, in addition, forms a portion of the generally rectangular frame beneath gate 44 and supports the gate for sliding movement. Since conduit 38 is rectangular in cross section, only a minimum amount of space is required in which to fit the conduit. A transition section 136 at each end of conduit 38 permits a suction hose to be placed adjacent either end of conduit 38 for unloading from either side of a railway car.

For the gravity unloading of material, bottom cover 76 is first swung to open position after being lowered by rotation of crank arm 100. Then, gate 44 is opened to allow a gravity discharge of material.

In the pneumatic unloading of the material, the major portion of the material is removed when gate 44 is fully opened. However, a substantial amount of material remains supported on cover 76 when the air passes from hopper 14 directly into tubular member 38 and bypasses the material. The subsequent movement of gate 44 toward closed position at a relatively slow rate of speed results in a high velocity airstream being presented to the remaining material in proximity to the leading edge of the gate as it moves to closed position thereby effectively removing the remaining material. Thus, a highly effective cleanout of the outlet structure is provided.

In view of the above, it will be seen that the several objects of the invention are achieved and other advantageous results attained.

As various changes could be made in the above constructions without departing from the scope of the invention, it is intended that all matter contained in the above description or shown in the accompanying drawings should be interpreted as illustrative and not in a limiting sense.

What is claimed is:

1. A bottom outlet structure adapted to be secured beneath the bottom outlet of a hopper structure for the pneumatic discharge of particulate material and comprising a generally rectangular gate slidable back and forth in opposite directions between open and closed positions relative to said bottom outlet, a generally rectangular supporting frame extending downwardly from the gate on which the gate is supported for sliding movement, a bottom cover beneath the gate extending in a plane generally parallel to the plane of said gate and forming with the frame and gate an enclosed space of a uniform cross-sectional area in the closed position of the gate into which the material moves upon opening of the gate, said gate and said bottom cover being spaced from each other a maximum distance not substantially exceeding two inches, the exposed edge of the gate upon opening forming an entrance restriction to the space between the gate and cover, an elongate pneumatic conduit below the gate extending in a direction generally transversely of the sliding movement of the gate for substantially the entire length of the gate, and means forming a material passageway between the enclosed space and the conduit for removing the particulate material, said passageway being effectively positioned along substantially the entire length of the gate to permit the discharge of material from across the entire surface of the cover and along the length of the gate whereby a relatively high velocity airstream is formed at said restriction and the particulate material moves from the enclosed space to the conduit for pneumatic discharge.

2. In apparatus for pneumatically unloading finely-divided material, a hopper structure having sides funneling downwardly to a bottom discharge outlet, a generally rectangular gate slidable back and forth within a slotted opening communicating with the discharge outlet, a generally rectangular supporting frame extending downwardly from the gate on which the gate is supported for sliding movement, a bottom cover beneath the gate forming with the frame and gate an enclosed space in the closed position of the door into which material moves upon opening of the gate, an elongate conduit below the gate extending in a direction generally transversely of the sliding movement of the gate for substantially the entire length of the gate, said elongate conduit being of a noncircular cross section and forming at least a portion of a side of said rectangular frame for supporting the gate during its movement between open and closed positions, a transition section on each end of said elongate conduit being circular in cross section at its outer end whereby a suction hose circular in cross section may be connected adjacent either end of said conduit, said gate being movable in a direction away from the longitudinal axis of the conduit when moved to closed position and movable in a direction toward the longitudinal axis of the conduit when moved to open position, and means forming a material passageway between the enclosed space and the conduit whereby finely-divided material moves from the enclosed space to the condit for the pneumatic discharge of the material.

3. In apparatus for pneumatically unloading finely-divided material, a hopper structure having sides funneling downwardly to a bottom discharge outlet, a generally rectangular gate slidable back and forth within a slotted opening communicating with the discharge outlet, a generally rectangular supporting frame extending downwardly from the gate on which the gate is supported for sliding movement, a bottom cover beneath the gate extending in a plane generally parallel to the plane of said gate and forming with the frame and gate an enclosed space in the closed position of the door into which material moves upon opening of the gate, an elongate conduit below the gate extending in a direction generally transversely of the sliding movement of the gate for substantially the entire length of the gate, said gate being movable in a direction away from the longitudinal axis of the conduit when moved to closed position and movable in a direction toward the longitudinal axis of the conduit when moved to open position, said elongate conduit being of a non-circular cross section and forming at least a portion of a side of said rectangular frame for supporting the gate during its movement between open and closed positions, a transition section on each end of said elongate conduit of a circular cross section at its outer end and inclined upwardly from its inner end whereby a suction hose circular in cross section may be connected adjacent either outer end of said conduit, said gate and said bottom cover being spaced from each other a maximum distance adjacent the conduit generally less than around two inches, and means forming a material passageway between the enclosed space and the conduit whereby finely-divided material moves from the enclosed space to the conduit for the pneumatic discharge of the material.

4. In apparatus for pneumatically unloading finely-divided material as set forth in claim 3, said means forming a material passageway comprising a plurality of slots spaced along the length of said conduit, one of said slots being positioned adjacent each end of said conduit.

5. Apparatus for selectively unloading either pneumatically or by gravity comprising, a hopper structure having sides funneling downwardly to a bottom discharge outlet, a generally rectangular gate slidable back and forth within a slotted opening communicating with the discharge outlet, a generally rectangular supporting frame extending downwardly from the gate on which the gate is supported for sliding movement, a bottom cover beneath the gate extending in a plane generally parallel to the plane of said gate and forming with the frame and gate an enclosed space in the closed position of the door into which material moves upon opening of the gate, an elongate pneumatic conduit below the gate extending beneath the gate in a direction generally transversely of the sliding movement of the gate for substantially the entire length of the gate, said gate being movable in a direction away from the longitudinal axis of the conduit when moved to closed position and movable in a direction toward the longitudinal axis of the conduit when moved to open position, said elongate conduit forming at least a portion of a side of said rectangular frame and supporting the gate during its sliding movement between open and closed positions, and means forming a material passageway between the enclosed space and the conduit whereby finely-divided material moves from the enclosed space to the conduit for the pneumatic discharge of the material, said bottom cover being movable beteween open and closed positions relative to the enclosed space to permit gravity unloading in the open position thereof and pneumatic unloading in the closed position thereof.

6. Apparatus for selectively unloading either pneumatically or by gravity as set forth in claim 5 wherein said gate and said bottom cover are spaced from each other a maximum distance adjacent the conduit less than around two inches whereby a relatively high velocity airstream flows from the enclosed space into the elongate conduit, and said elongate conduit has an inner vertical dimension substantially greater than the height of said enclosed space.

7. In appartaus for selectively unloading finely-divided particles either pneumatically or by gravity, a hopper structure having sides funneling downwardly to a bottom discharge outlet, a generally rectangular gate slidable back and forth within a slotted opening communicating with the discharge outlet, a supporting frame extending downwardly from the gate on which the gate is supported for sliding movement, a bottom cover beneath the gate forming with the frame and gate an enclosed space in the closed position of the door into which material moves upon opening of the gate, an elongate conduit below the gate extending in a direction generally transversely of the sliding movement of the gate for substantially the entire length of the gate, said gate being movable in a direction away from the longitudinal axis of the conduit when moved to closed position and movable in a direction toward the longitudinal axis of the conduit when moved to open position, means forming a material passageway between the enclosed volume and the conduit whereby finely-divided material moves pneumatically from the enclosed space to the conduit for the pneumatic discharge of the material, said bottom cover fitting against the lower surface of said frame in the closed position thereof and being movable between open and closed positions relative to the enclosed space to permit gravity unloading in the open position thereof and pneumatic unloading in the closed position thereof, and means to hold the axes of said cover oriented and parallel to the axes of said gate during movement of the cover between open and closed positions.

8. In apparatus for selectively unloading either pneumatically or by gravity as set forth in claim 7, means to raise said bottom cover into engagement with said frame and to lower the bottom cover away from the frame, and means to support the bottom cover after being lowered during its movement from beneath the frame to open position clear of said frame.

9. In apparatus for selectively unloading either pneumatically or by gravity as set forth in claim 7, said means to hold the axes of said cover oriented comprising a parallelogram linkage connected to said cover and mounting the cover for movement between open and closed positions.

10. A hopper structure adapted to unload finely-divided particles, selectively, either by gravity or pneumatically, comprising a plurality of downward funneling surfaces leading to a bottom gravity discharge opening, a generally rectangular gate mounted for sliding movement in a horizontal plane between open and closed positions relative to the discharge opening, a generally rectangular housing beneath said gate having an inner surface forming a continuation of said bottom discharge opening, a bottom cover adjacent the bottom of said housing and movable between closed and open positions relative to the bottom discharge opening, both said gate and said bottom cover being in open position when discharging by gravity, means to slide the gate unidirectionally from one side of said generally rectangular frame over which the gate moves between open and closed positions, the gate moving toward said one side when being opened and moving away from said one side when being closed, said gate and bottom cover being in a generally parallel relation to each other and forming when the gate is between open and closed positions a pneumatic discharge chamber therebetween having a generally uniform cross-sectional area, a passageway communicating with the discharge chamber and disposed generally adjacent said one side of said frame, said passageway being effectively positioned along substantially the entire length of the adjacent side of the discharge chamber to permit the discharge of particles from across the entire surface of the cover and along the length of the exposed edge of said gate when the gate is in fully open position, and a pneumatic discharge conduit communicating with said passageway to receive particles from said chamber and to discharge the particles pneumatically, said gate being moved at least to a partially open position for pneumatic unloading with the exposed edge of the gate continuously forming an entrance restriction of a generally uniform size entirely across said chamber between the gate and bottom cover whereby a major portion of the particles is unloaded leaving only a relatively small amount of particles within the hopper structure, said gate after the major portion of the particles is unloaded being moved across substantially the entire width of the bottom cover with a relatively high velocity airstream at the restriction when a pressure differential exists between the conduit and the interior of the hopper structure, the high velocity airstream moving across the bottom cover as the gate is moved and providing a generally constant flow of air between the leading edge of the gate and the cover across the entire surface of the cover with the restriction being of a generally uniform cross-sectional area during the entire traversing movement of the gate thereby to remove substantially all the particles remaining within the hopper structure.

11. A hopper structure as set forth in claim 10 wherein said gate and said bottom cover are spaced from each other a maximum distance not substantially exceeding two inches.

References Cited by the Examiner

UNITED STATES PATENTS

| | | | |
|---|---|---|---|
| 878,443 | 2/1908 | Young | 222—561 XR |
| 2,393,932 | 1/1946 | Petroe | 302— 52 XR |
| 2,738,736 | 3/1956 | Dorey | 105—282 |
| 2,926,963 | 3/1960 | Dorey | 302—52 |
| 2,962,325 | 11/1960 | Dorey | 302—52 |
| 3,085,517 | 4/1963 | Smith | 222—561 XR |
| 3,105,721 | 10/1963 | Collins et al. | 214—83.28 |

LOUIS J. DEMBO, *Primary Examiner.*

WALTER SOBIN, *Assistant Examiner.*